(12) United States Patent
Valasek (10) Patent No.: US 9,364,932 B2
(45) Date of Patent: Jun. 14, 2016

(54) DEVICE FOR A BODY'S SPHERICAL MOTION CONTROL

(71) Applicant: CVUT v Praze, Fakulta stronjni, Prague (CZ)

(72) Inventor: Michael Valasek, Prague (CZ)

(73) Assignee: CVUT V PRAZE, FAKULTA STROJNI, Prague (*) Notice: Subject to any disclaimer, the term of this patent is extended or adjusted under 35 U.S.C. 154(b) by 0 days.

(21) Appl. No.: 14/283,535

(22) Filed: May 21, 2014

(65) Prior Publication Data

US 2014/0290419 A1    Oct. 2, 2014

Related U.S. Application Data

(62) Division of application No. 12/740,835, filed as application No. PCT/CZ2008/000134 on Oct. 29, 2008, now abandoned.

(30) Foreign Application Priority Data

Oct. 31, 2007 (CZ) .................................. 2007-761

(51) Int. Cl.
*B23Q 1/54* (2006.01)
*B25J 9/00* (2006.01)
*B25J 17/02* (2006.01)

(52) U.S. Cl.
CPC .............. *B23Q 1/545* (2013.01); *B23Q 1/5462* (2013.01); *B25J 9/0057* (2013.01); *B25J 9/0072* (2013.01); *B25J 17/0266* (2013.01); *Y10T 74/20348* (2015.01)

(58) Field of Classification Search
CPC ............ B23Q 1/54; B23Q 1/32; B23Q 1/545; B23Q 1/5462; B25J 9/0057; B25J 9/0072; B25J 17/0266
See application file for complete search history.

(56) References Cited

U.S. PATENT DOCUMENTS 3,952,979 A    4/1976    Hansen
5,656,905 A    8/1997    Tsai
(Continued)

FOREIGN PATENT DOCUMENTS

DE         199 55 520       5/2001
WO        WO 00/25976      5/2000

OTHER PUBLICATIONS

Kurtz, R. et al., "Multiple-Goal Kinematic Optimization of a Parallel Spherical Mechanism with Actuator Redundancy," IEEE Transactions on Robotics and Automation, vol. 8, No. 5, Oct. 1992, pp. 644-651.

(Continued)

*Primary Examiner* — Terence Boes
(74) *Attorney, Agent, or Firm* — Preti Flaherty Beliveau & Pachios LLP (57) ABSTRACT

A device for a body's spherical motion control connected with a frame by means of a spherical joint arranged on a shank connecting the body with the frame and through actuating arms with drives, where the shank is sectional and the spherical joint is arranged between the first part of the shank which is firmly fixed to the frame and the second part of the shank which is firmly fixed to the body, whereas the number of parallel arms with drives is redundant. In order to increase the accuracy of both the self-calibration itself and a follow-up positioning of the body in the work area and to achieve a large range of the body's rotating, the number of parallel arms with drives is five at minimum and the length of the first part of the shank connected to the frame is longer than the distance of the body edge from the point of connection of the shank to the body.

5 Claims, 8 Drawing Sheets

(56) References Cited

U.S. PATENT DOCUMENTS

| | | |
|---|---|---|
| 5,987,726 A | 11/1999 | Akeel |
| 6,329,812 B1 | 12/2001 | Sundin |
| 6,330,837 B1 | 12/2001 | Charles et al. |
| 6,477,912 B2 | 11/2002 | Song et al. |
| 2004/0126198 A1 | 7/2004 | Chen |

OTHER PUBLICATIONS

Valasek, M. et al., "The Innovative Potential of Redundantly Actuated PKM," In: Naugebauer, R.: Proc. of Parallel Kinematice Seminar 2004, IWU FhG, Chemnitz 2004, pp. 365-384.

Schwaar, M. et al., "Mechatronic Design, Experimental Property Analysis and Machining Strategies for a 5-Strut-PKM," In: Naugebauer, R.: Proc. of Parallel Kinematice Seminar 2002, IWU FhG, Chemnitz 2002, pp. 671-681.

DEVICE FOR A BODY'S SPHERICAL MOTION CONTROL

This is a Divisional Application of U.S. application Ser. No. 12/740,835 filed on Apr. 30, 2010 as a 371 national phase filing of PCT/CZ2008/000134, which was filed on Oct. 29, 2008 claiming priority to Czech Republic Application No. PV 2007-761, filed Oct. 31, 2007. Each of the above-named related applications is incorporated herein by reference.

TECHNICAL FIELD

The invention involves a device for a spherical movement of a body connected with a frame through a spherical rule joint aligned on the shank connecting a body with a frame and with a help of control arms with drives.

The controlled spherical motion of a body is important in many applications, for example for tilting heads of machining devices or telescopes and antennas adjusting. Such a movement is realized today either through mechanisms with a series kinematics structure, mostly based on gimbal or mechanisms with a parallel kinematic structure. Mechanisms with a series kinematics structure have a large moveability, thereupon a range of 180° in two rotations, but they are mass, their dynamic capabilities are low and they do not allow a continuous movement from one position to another in all the positions. On the other hand, mechanisms with a parallel kinematic structure have a limited moveability, thereupon a range less than 180° in two rotations usually, but they feature substantially lower weight, have higher dynamic capabilities and they enable a continuous movement from all positions to all of the subsequent positions.

Tilting heads of machining devices were successfully solved with the help of parallel kinematic structures in PCT WO 00/25976 patent for Sprint Z3 tilting head made by DS Technologie company where the ability to move continuously between all the positions with a higher dynamics was achieved. Singular positions do not allow a larger angle range at these mechanisms. The improvement of this state-of-the-art is possible to be achieved through application of redundant (excessive) number of arms with drives, the number of which is higher than the number of degrees of freedom. Such a mechanism with a parallel kinematic structure for the spherical kinematics is described in an article by Kurtz, R., Hayward, V.: Multiple-Goal Kinematic Optimization of a Parallel Spherical Mechanism with Actuator Redundancy, IEEE Transactions on Robotics and Automation, 8(1992), 5, pp. 644-651 where there are 4 parallel arms used for a motion of a platform fixed to a frame with a spherical joint on a shank extended from the frame. This solution enables to increase a range of achievable angle positions substantially but it does not allow to reach a range 90° and more, in addition, there is a manipulability lowered near extreme positions. This limitation emerges by two reasons. Both there are collisions occurring between the platform and the shank extending from the frame at extreme positions near 90° and the excessive number of 4 parallel arms is inadequate for a sufficient distance from singular positions within all the work area.

The application of four parallel arms is insufficient in term of utilization of the whole device's self-calibration feature and enhanced accuracy of its positioning on the basis of unnecessary number of measurements connected with the redundant number of arms with drives. Self-calibration feature is practicable but its achieved accuracy is not high.

An alternative mechanism with a parallel kinematic structure which enables to reach a platform tilting angles range up to 90° is Octapod (Valášek, M., Šika, Z., Bauma, V., Vampola, T.: The Innovative Potential of Redundantly Actuated PKM, In: Neugebauer, R.: Proc. of Parallel Kinematice Seminar 2004, IWU FhG, Chemnitz 2004, pp. 365-384) and Metrom (Schwaar, M., Jaehnert, T., Ihlenfeldt, S.: Mechatronic Design, Experimental Properte Analysis and Machining Strategie for a 5-Strut-PKM, In: Neugebauer, R.: Proc. of Parallel Kinematice Seminar 2002, IWU FhG, Chemnitz 2002, pp. 671-681). Octapod's disadvantage is that arms are positioned all around the platform. Metrom's disadvantage is lowering manipulability near extreme positions.

The aim of this invention is a device for a controlled spherical motion of bodies on the basis of mechanisms with a parallel kinematic structure which would achieve a moveability consonant to mechanisms with a series kinematic structure, thereupon a range up to 200° in two rotations while preserving all advantages of mechanisms with a parallel kinematic structure. Another goal of this invention is to achieve, at the same time, a higher accuracy of a body's positions adjusting.

Subject Matter of the Invention

Subject matter of the device for a spherical motion of a body consists in a fact that the shank connecting the body with the frame is sectional and the spherical joint is arranged between the first part of the shank which is firmly fixed to the frame and the second part of the shank which is firmly fixed to the body while the number of parallel arms with drives is excessive. An advantage is the number of parallel arms with drives being at least five and a length of the shank part fixed to the frame being longer than a distance of the body's edge from a point where the shank part is fixed to the body.

Actuating parallel arms are fitted with the same drive or a combination of telescopic, extensible continuous, traversable or rotational drives.

Alternatively, the actuating parallel arms are connected with the body through an arm spherical joint and a body's shank.

As an advantage, the first part of the shank is fitted with a drive for change of its length, its inclination, eventually for a modification of the spherical joint position. In the case of symmetrical arrangement of the actuating parallel arms and their number being six, there would be an advantage to extend them from three spots on the frame to three spots on the body. In a next alternative design, the actuating parallel arms are led from points on the frame obliquely into points on the body, whereas the top end of one actuating parallel arm is situated eventually above the bottom end of an adjacent actuating parallel arm.

The advantage of this device consists in creation of the sectional shank which enables rotating the body by 90° and more without collisions with the shank and in application of at least five redundant arms which allow to remove an occurrence of singular positions and to provide a sufficient distance from them within all the work area of the body. The application of at least five redundant arms with drives and admeasurement, which is at least one more than it is necessarily needed for self-calibration, enables to increase the accuracy substantially, and that both of the self-calibration itself and of a follow-up positioning of the body in the work area.

SURVEY OF FIGURES ON DRAWINGS

The device for a body's spherical motion is schematically pictured in attached figures, where.

EXAMPLES OF THE DEVICE DESIGN

This is a Divisional Application of U.S. application Ser. No. 12/740,835 filed on Apr. 30, 2010 as a 371 national phase filing of PCT/CZ2008/000134, which was filed on Oct. 29, 2008 claiming priority to Czech Republic Application No. PV 2007-761, filed Oct. 31, 2007. Each of the above-named related applications is incorporated herein by reference for all purposes.

Figure 1:
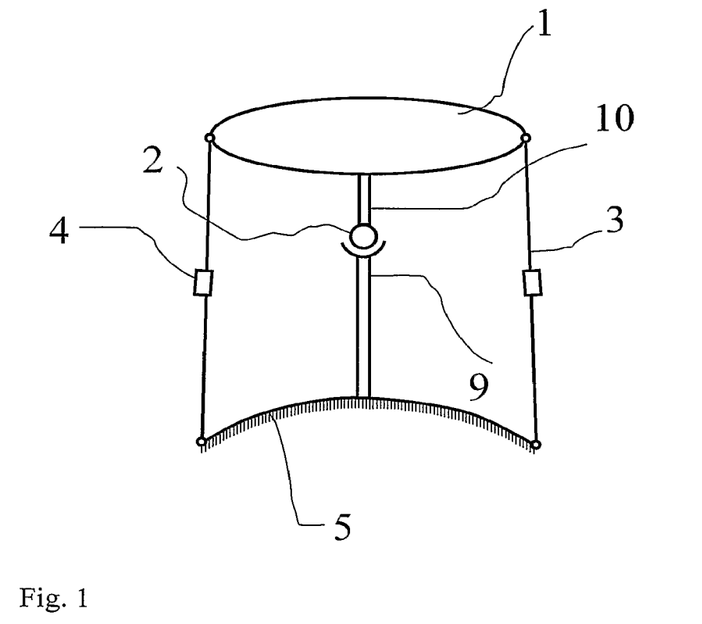
FIG. 1 Represents an arrangement of the body connected to the frame by spherical joint and performing a controlled spherical motion with a help of drives in parallel arms, FIG. 2 Represents an arrangement of the body connected to the frame by a spherical joint and performing a controlled spherical motion with a help of telescopic drives in parallel arms, FIG. 3 Represents an arrangement of the body connected to the frame by a spherical joint and performing a controlled spherical motion with a help of extensible continuous drives in parallel arms, FIG. 4 Represents an arrangement of the body connected to the frame by a spherical joint and performing a controlled spherical motion with a help of traversable drives in parallel arms, FIG. 5 Represents an arrangement of the body connected to the frame by a spherical joint and performing a controlled spherical motion with a help of rotational drives in parallel arms, FIG. 6 Represents an arrangement of the body connected to the frame by a spherical joint which is, towards the moving body, positioned on a shank and performing a controlled spherical motion with a help of various types of drives in parallel arms, FIG. 7 Represents an arrangement of the body connected to the frame by a spherical joint, with a turning of the body by more than 90° from the basic position, FIG. 8 Demonstrates one of potential arrangements of actuating parallel arms in plan view, FIG. 9 Demonstrates an arrangement of actuating parallel arms according to FIG. 8 in front view, FIG. 10 Demonstrates one of other potential arrangements of actuating parallel arms in plan view, FIG. 11 Demonstrates an arrangement of actuating parallel arms according to FIG. 10 in front view, FIG. 12 Represents a similar arrangement of the body connected to the frame by a spherical joint, with a turning of the body by more than 90° from the basic position, as it is evident in FIG. 7, though with an alternative connection of the actuating parallel arms with the body, FIG. 13 Represents an arrangement of the body connected to the frame by a spherical joint and through a withdrawable shank, FIG. 14 Demonstrates another potential arrangement of actuating parallel arms in front view, and FIG. 15 Represents an arrangement of the body connected to the frame by a spherical joint with traversable drives in six parallel arms.

As it is evident in FIG. 1, body 1 is connected to frame 5 through a shank, the first part 9 of which is firmly fitted to frame 5 and its second part 10 is firmly fitted to body 1. The first part 9 of the shank can eventually create one component together with frame 5 and the second part 10 may form one component with body 1. Both parts 9, 10 of the shank are together connected to spherical joint 2 which enables the body 1 motion towards frame 5. Body 1 and frame 5 are connected to one another through parallel actuating arms 3 which are fitted with drives 4 for draw-out movement of actuating arms 3. These parallel arms 3 with draw-out drives 6 can be realized through working screws or telescopic working screws, connected to the body and the frame with spherical or universal joints. The controlled spherical motion of body 1 is achieved by adapting the length of individual actuating arms 3. The number of parallel arms 3 with drives 4 is redundant. It means, that the number of parallel actuating arms 3 with drives is higher than the number of degrees of freedom of body 1, so that the number of parallel actuating arms 3 is at least four. With regard to excluding singular positions occurrence in work area of the spherical motion of body 1, it is advantageous when the number of parallel arms 3 with drives 4 is five at minimum. The application of minimally five additional parallel actuating arms 3 allows to increase both the accuracy of self-calibration itself and the follow-up accuracy of positioning body 1 in the work area.

The application of the sectional shank composed of the first and the second part 9 and 10 enables to turn body 1 by more than 90°. For the purpose of such a turn, a length of the first part 9 of the shank fixed to frame 5 should be longer than a distance of the edge of body 1 from a point where the second part 10 of the shank is fixed to body 1. Adapting the length of the second part of shank 10, a varied angle range of rotating body 1 over 90° can be achieved.

Figure 2:
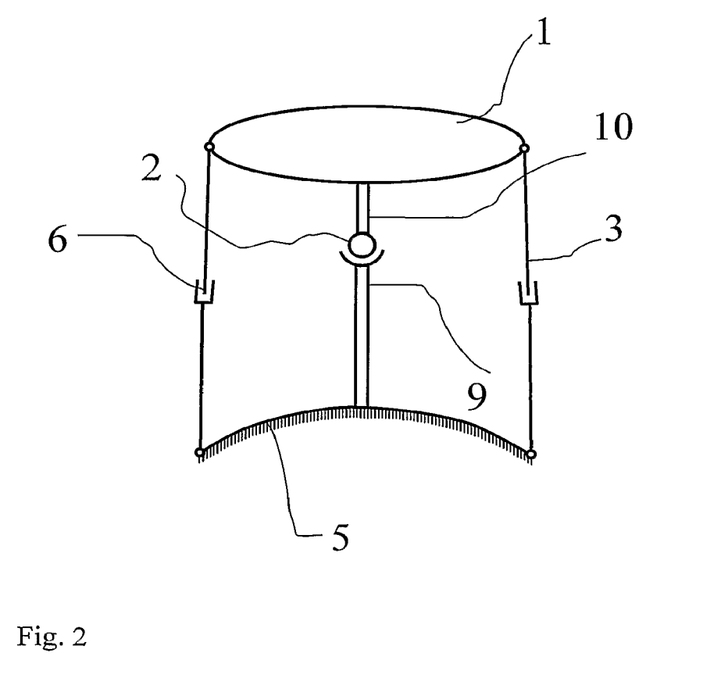
Figure 3:
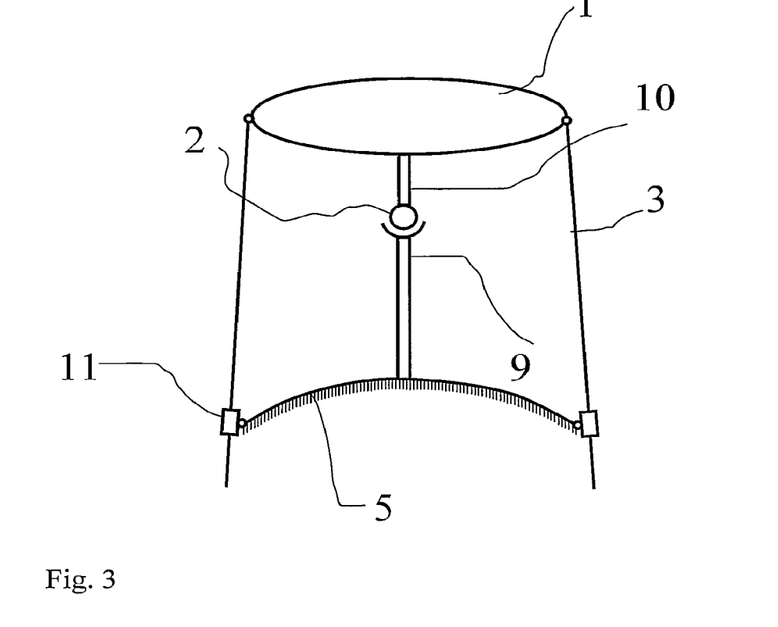
Figure 4:
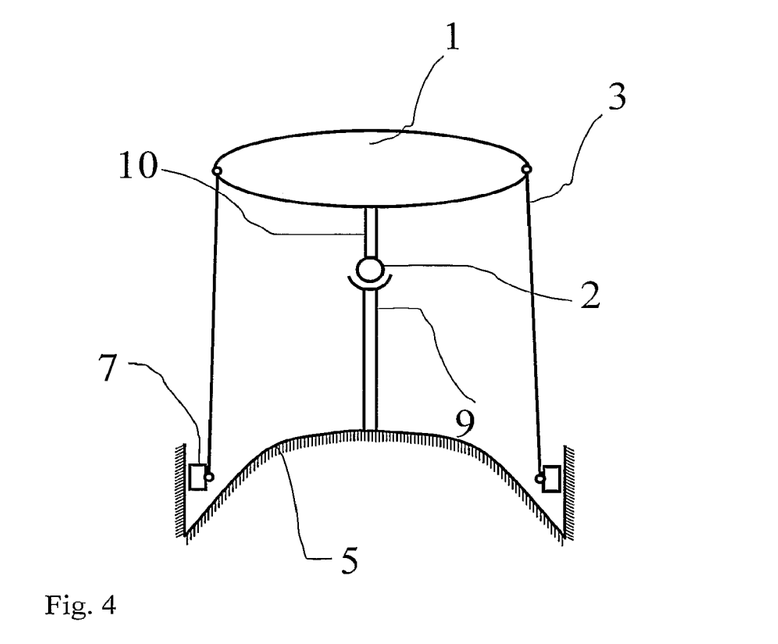
Figure 5:
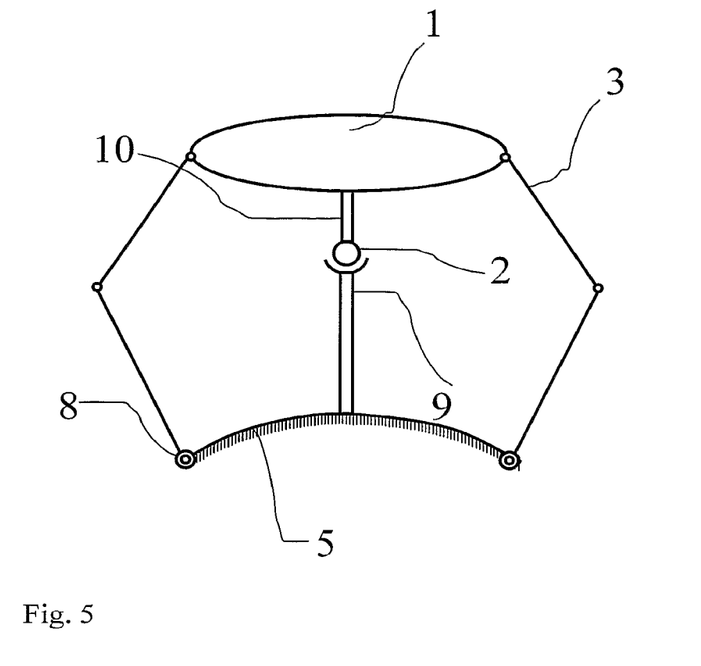
Figure 6:
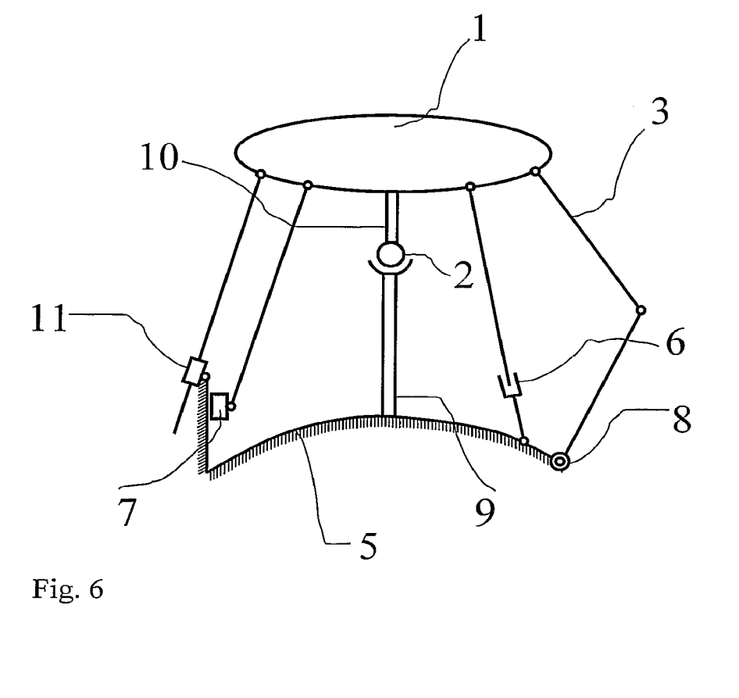
Figure 15:
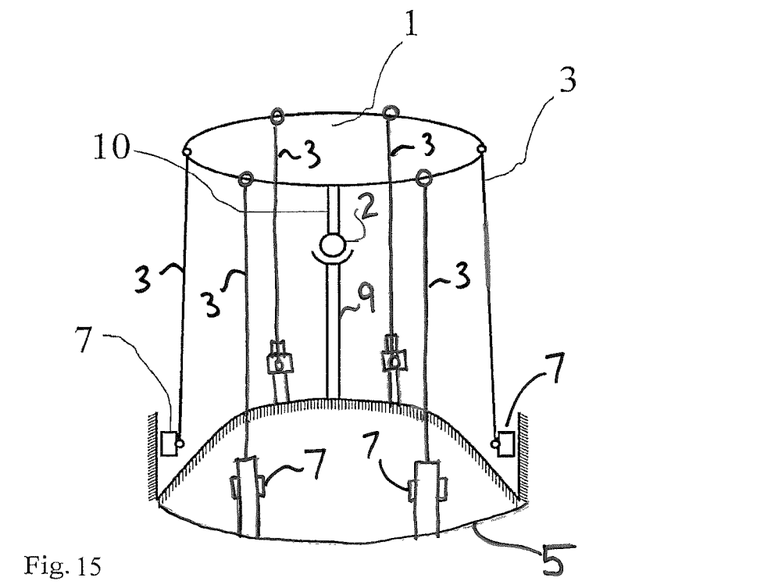

The way of controlled rotating of body 1 with the help of actuating parallel arms 3 is achieved through drives, with the help of which either the length of actuating parallel arms 3 is modified or the actuating parallel arms are rearranged with regard to frame 5, in case of need it is possible to use a combination of various drives for the length change or for a movement of actuating parallel arms 3. Thus, in FIG. 2, telescopic drives 6 are used to change the length of actuating positioning arms 3; in FIG. 3, extensible continuous drives 11 are used to move actuating parallel arms 3 towards frame 5; in FIG. 4, traversable drives 7 are used to move bottom ends of actuating parallel arms 3 towards frame 5; in FIG. 15, an embodiment of the present invention similar to that shown in FIG. 4, six actuating parallel arms 3 are provided; in FIG. 5, rotational drives 8 are used for turning sectional actuating parallel arms 3 when extending or shortening of particular distances between body 1 and frame 5 is achieved by turning individual parts of actuating parallel arms 3. In FIG. 6, there can be evidently seen a possible use of above mentioned drive types combination at one device, i.e. telescopic drive/s 6, combined with rotational drive/s 8, extensible continuous drive/s 11 and traversable drive/s 7. A rotational joint may even be an intermediate joint of an actuating parallel arm connecting it with body 1 or a joint of an actuating parallel arm with body 1. There is an advantage of rotational joint 8 positioning on frame 5, so that the rotational drive weight need not to be moved along by the arm's movement.

Figure 7:
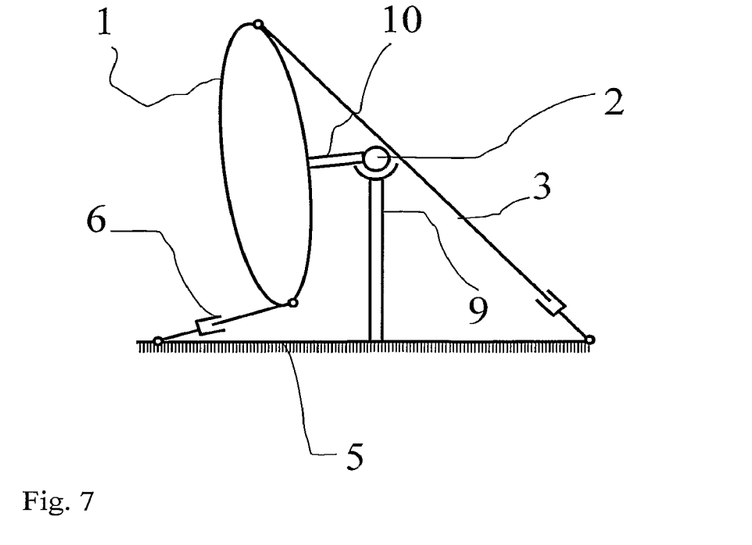

In FIG. 7, there can be evidently seen tilting of body 1 in a shape of a plane plate by more than 90° with regard to its basic horizontal position, as it is demonstrated in pictures above. A drive type is not essential and also it is not limited to above mentioned drives.

Figure 8:
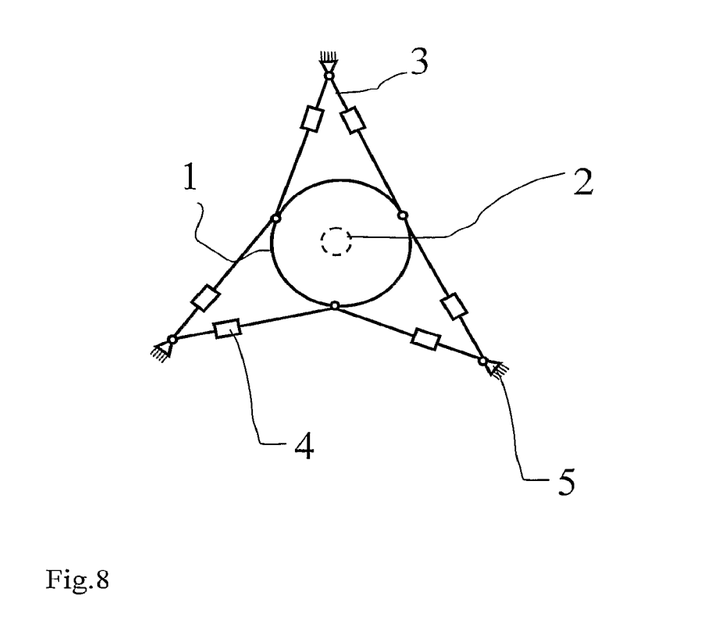

Points of actuating parallel arms 3 connection both with frame 5 and with body 1 are possible to be opted at random practically; a symmetrical arrangement of these points of connection is useful, as it is evident in plan view in FIG. 8 where there are 6 actuating parallel arms 3 with drives 4 used for body 1 spherical motion control, whereas there are always top ends of adjoining actuating parallel arms 3 connected by a joint and their bottom ends are connected with ends of adjacent actuating parallel arms 3 on opposite sides. This arrangement of actuating parallel arms 3 is then showed in front view in FIG. 9. A system of actuating parallel arms 3 arranged in this way forms a nexus of six triangles.

Figure 9:
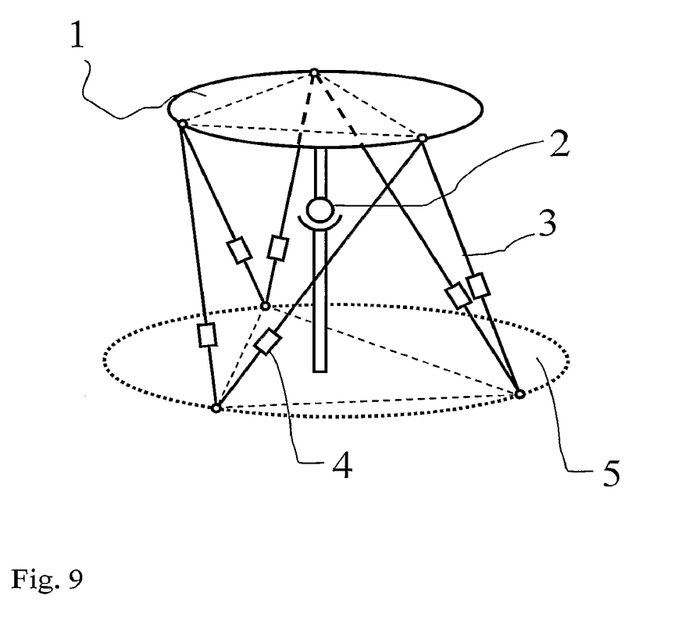
Figure 10:
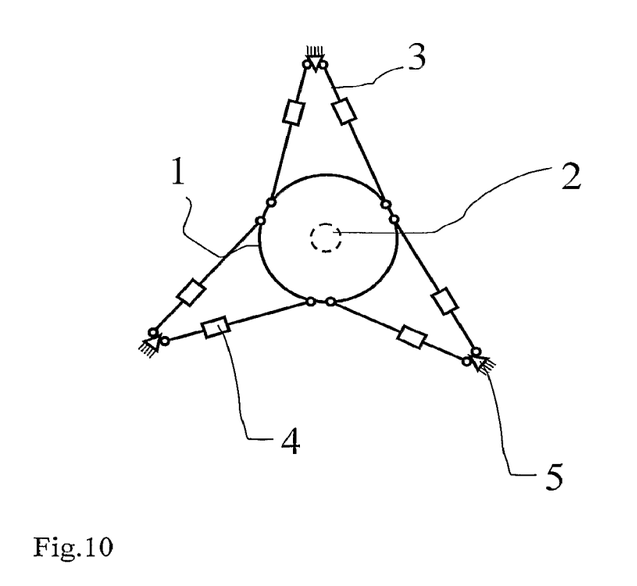
Figure 11:
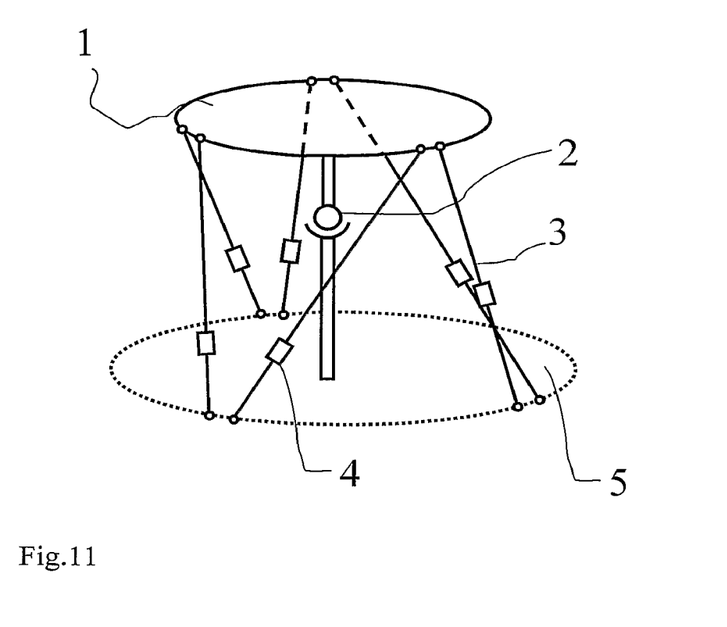

A similar symmetrical arrangement of actuating parallel arms 3 and their connection with frame 5 and body 1 with a configuration according to FIGS. 8 and 9 is evident in FIG. 10 where can be evidently seen that particular ends of adjacent actuating parallel arms 3 are pointed towards one another, though their connection with frame 5 and body 1 is not situated in one conjoint place and points of connection are separated from one another. In FIG. 11, there is the arrangement of actuating parallel arms 3 according to FIG. 10 showed in front view.

Figure 12:
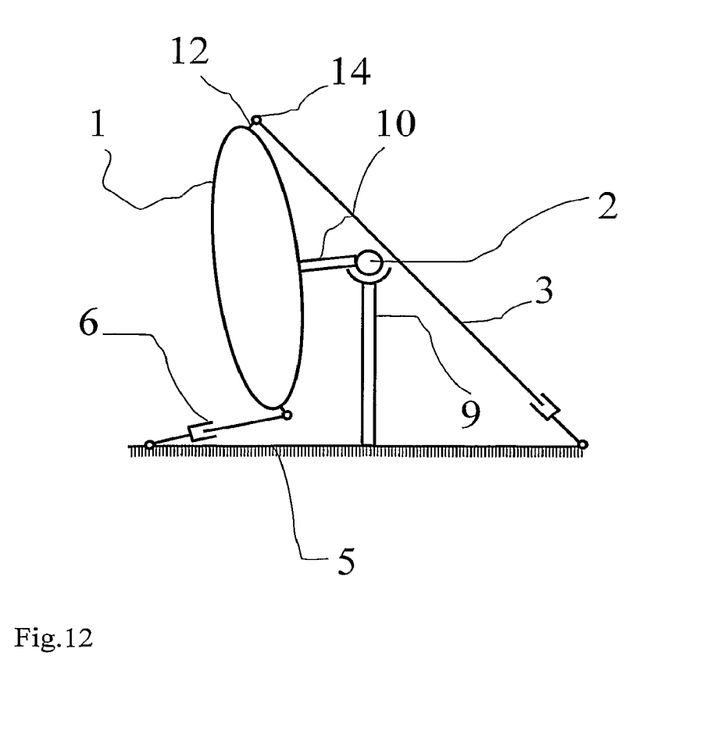

One of other potential device designs with alternative junction of actuating arms 3 with body 1 is shown in FIG. 12, which corresponds with the device design in a tilted position according to FIG. 7, therewith clamping of actuating parallel arms 3 ends with body 1 is realized by means of shank 12 of body 1 and an arm's spherical joint 14 which connects shank 12 to actuating parallel arm 3.

Figure 13:
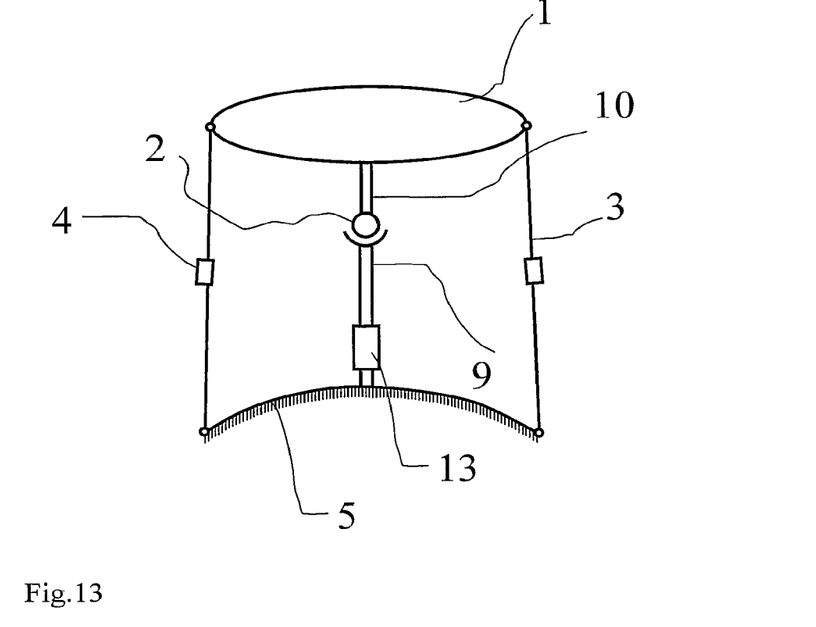

In FIG. 13, there can be seen alternative configuration of the device for a body's spherical motion control where some part of the shank connecting body 1 and frame 5 is fitted, except for spherical joint 2, with adjusting drive which is arranged on the first part 9 of the shank here. Adjusting drive 13 serves for adjustment of spherical joint 2 position, e.g. its distance from frame 5 and it is particularly favourable when using a device for control of a spherical motion of replaceable bodies 1 of different size, eventually depending upon a need of various extensions of body 1 deflection from its basic position. Adjusting drive 13 enables a better handling, too, eventually a transportation of the device.

Figure 14:
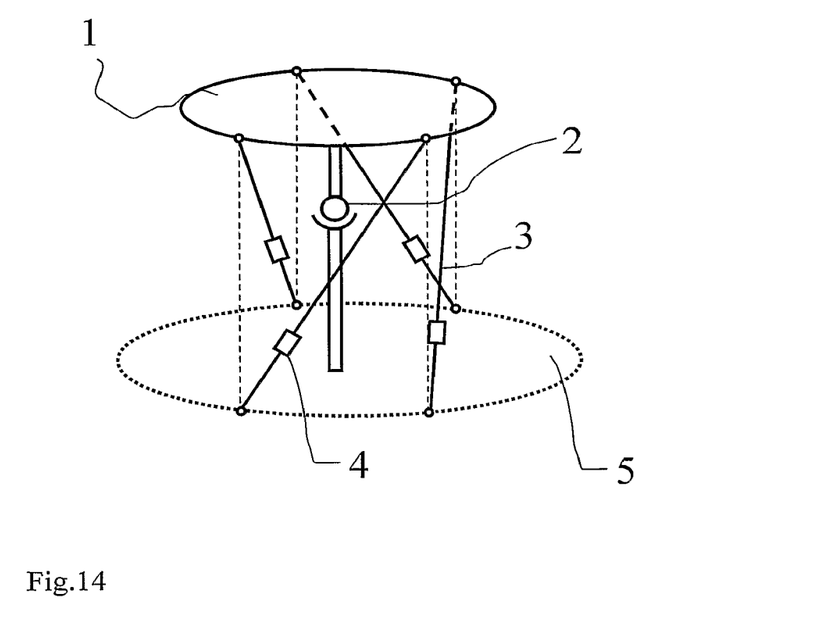

FIG. 14 shows other possible arrangement of actuating parallel arms 3 in front view where actuating parallel arms 3 are guided symmetrically along the periphery of frame 5 and body 1, so that their bottom edges are situated below top ends of adjoining actuating positioning arms 3.

The invention claimed is:
1. A device for controlling spherical motion, comprising:
a frame;
a circular body having a substantially circular perimeter;
a shank comprising:
  a first linear shank portion having a first end permanently fixed and firmly fitted to the frame thereby creating a single shank-frame component,
  a second linear shank portion having a first end permanently fixed and firmly fitted to the body at a right angle thereto thereby creating a single shank-body component, and
  a single non-actuated spherical joint coupling a second end of the first shank portion to a second end of the second shank portion;
six traversable drives coupled to the frame, each traversable drive configured to move along the frame substantially parallel to the first linear shank portion; and
six linear actuating arms, each of a fixed length, each actuating arm having a first end attached to a respective traversable drive and a second end coupled to the body at a respective point around the circular perimeter,
wherein a first end of the second linear shank portion is fixed and firmly fitted at a center of the substantially circular body, and
wherein a length of the first linear shank portion is longer than a radius of the substantially circular body.

2. The device according to claim 1, wherein a length of the first linear shank portion is longer than a distance from an edge of the substantially circular perimeter to a point of connection of the second shank portion to the body.

3. The device according to claim 1, further comprising:
an arm spherical joint provided at the second end of each actuating arm; and
six perimeter body shanks disposed about the substantially circular perimeter of the body,
wherein each arm spherical joint is coupled to a respective perimeter body shank.

4. The device according to claim 1, wherein:
first, second and third sets of actuating arms are defined among the six actuating arms, wherein each for the first, second and third sets comprises two actuating arms each with respective first ends coupled to the frame and no arm in one of the first, second and third sets is in the other of the first, second and third sets,
wherein the first, second and third sets of arms are symmetrically positioned around a periphery of the frame,
wherein fourth, fifth and sixth sets of arms are defined among the six actuating arms,
wherein each of the fourth, fifth and sixth sets comprises two actuating arms each with respective second ends attached to the body,
wherein the fourth, fifth and sixth sets are symmetrically positioned around the substantially circular perimeter of the body, and
wherein no two actuating arms in any of the fourth, fifth and sixth sets is the same as any two actuating arms in any of the fourth, fifth and sixth sets.

5. The device according to claim 1, wherein each of the six linear actuating arms is of a same fixed length.

* * * * *